United States Patent [19]

Felice

[11] 4,370,907
[45] Feb. 1, 1983

[54] POSITIVE STOP CENTER

[76] Inventor: Leo C. Felice, P.O. Box 904, Woonsocket, R.I. 02895

[21] Appl. No.: 204,335

[22] Filed: Nov. 5, 1980

[51] Int. Cl.³ .............................................. B23B 23/02
[52] U.S. Cl. .................................................. 82/33 R
[58] Field of Search ...................................... 82/33 R

[56] References Cited
U.S. PATENT DOCUMENTS

| | | | |
|---|---|---|---|
| 309,288 | 12/1884 | Birkmann | 82/33 R |
| 979,034 | 12/1910 | Rowe et al. | 82/33 R |
| 1,829,619 | 10/1931 | Svenson | 82/33 R |
| 2,463,385 | 3/1949 | Holohan | 82/33 R |
| 2,514,970 | 7/1950 | Prickett | 82/33 R |
| 3,943,804 | 3/1976 | Wolski et al. | 82/33 R |

Primary Examiner—Leonidas Vlachos
Attorney, Agent, or Firm—Wolf, Greenfield & Sacks

[57] ABSTRACT

A system for accurately positioning and locating a workpiece in a machine tool, including a master sleeve to be fitted into the standard tapered socket of a machine tool spindle. An interchangeable center housing is fitted into a tapered socket in said master sleeve, and a center pin is spring-mounted within said housing. The center pin projects out of said housing, and is retractable into the housing as required when the workpiece is positioned on the machine tool. The housing can be quickly removed from the master sleeve and replaced with a housing having a center pin of a different diameter, in order to accommodate a workpiece having a center hole of different diameter than that of the previous workpiece. A locking screw is provided in the housing to permit locking of the center pin in place after the workpiece has been mounted thereon. A facing disc can be positioned on the projecting end of the center pin in order to accommodate workpieces of diameter smaller than that of the center pin itself.

3 Claims, 7 Drawing Figures

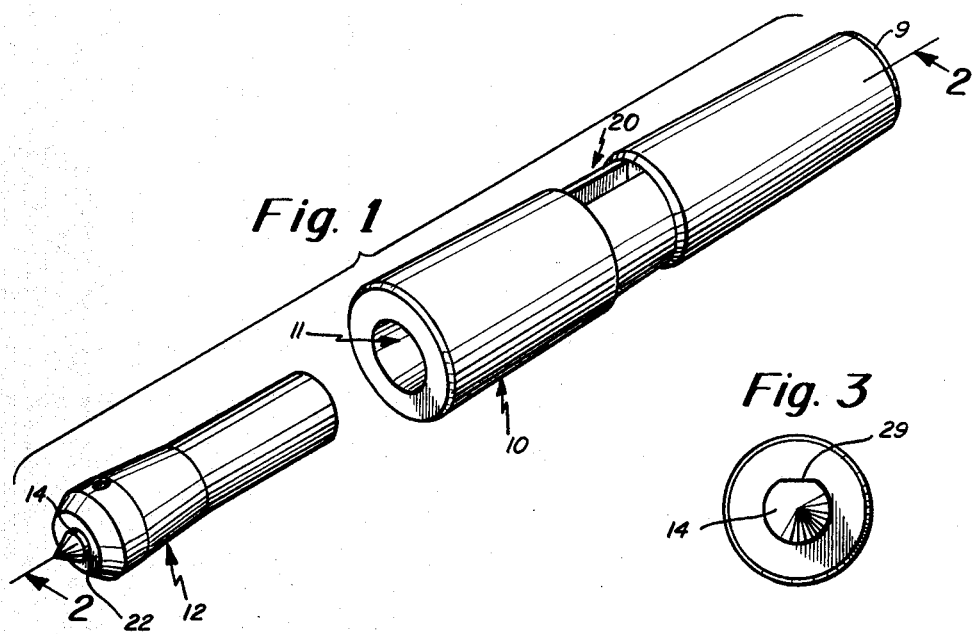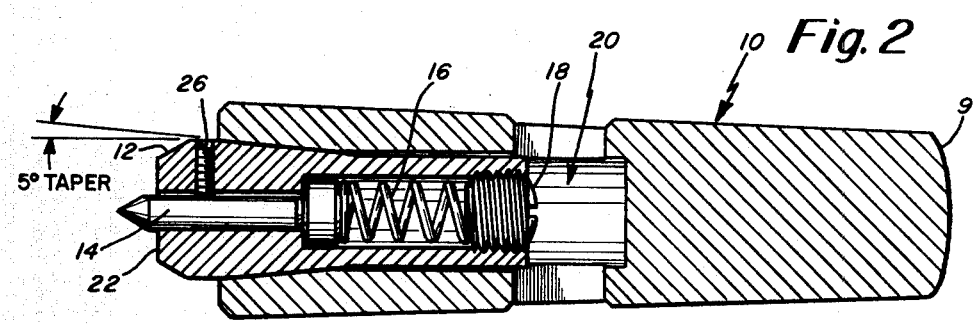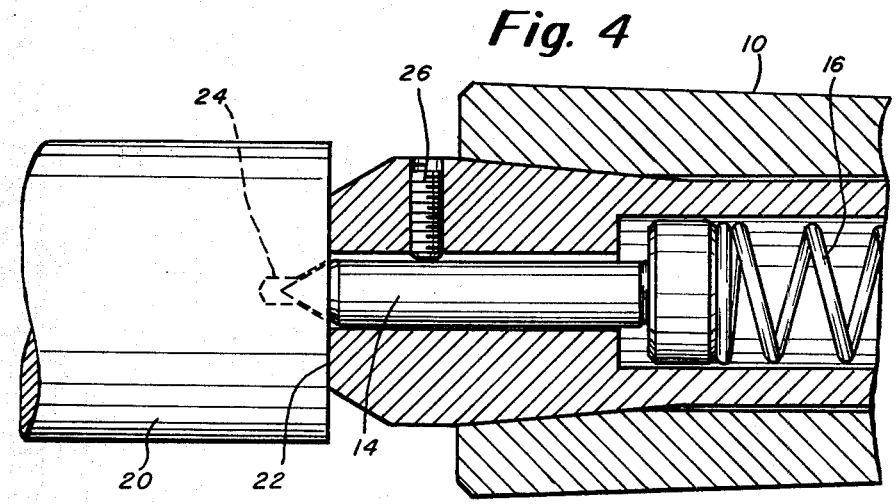

POSITIVE STOP CENTER

BACKGROUND OF THE INVENTION

This invention relates to a system for accurately positioning and locating a workpiece between the centers of a machine tool, and further to such a system, employed at the headstock spindle of the machine tool, which permits rapid accommodation of workpieces of various size having center holes of various diameters.

Generally, before a workpiece can be machined in a machine tool, a center hole must be drilled at each end of the workpiece so that the workpiece can be supported by the centers of the machine tool. This drilling operation is usually performed on a lathe or on a special center-drilling machine. The diameter of the center drill is determined primarily by the size of the piece to be machined: i.e., a workpiece of a large diameter would require a larger center drill than one of small diameter, since the former would need stronger support between centers. When a series of workpieces or parts to be machined are center-drilled, the depth of the center hole at the headstock end of the workpiece is normally kept approximately the same for all parts, so that once the machine has been set up for one part, additional parts can be machined without changing the initial set-up. However, a problem arises because the very act of drilling the center hole has proven not to be sufficiently accurate for many applications. Since the depths of the center-drilled holes can vary by a considerable amount, serious machining problems can arise. For example, if one wished to grind a number of shafts to incorporate a flange at a certain distance from the end of the shaft, it would be time-consuming and costly to reset the grinding tool for each piece in order to compensate for the differing depths of the center holes and the resulting relative change of position of the workpiece.

One solution to this problem is afforded by a procedure which involves the internal lapping and depth inspection of each individual workpiece, using an abrasive paste lapping compound. Although effective, the center-hole lapping method is extremely time-consuming and very expensive.

Another attempted solution is disclosed in U.S. Pat. No. 979,034 to Rowe et al., which concerns a device mounted in the live spindle of a lathe, having a center with a stop or shoulder against which the workpiece may be positioned. The center includes a spring-mounted center pin which projects beyond the shoulder or stop, and which center pin is adapted to recede to permit the workpiece to be carried against the shoulder when placed in position in the machine. In this way, compensation is made for any variation in the center hole depth of a series of workpieces without the necessity for re-setting the tool for each piece. However, the Rowe et al. device suffers from several shortcomings. For example, each Rowe et al. device is limited to use of a center pin of a single size, and no provision is made for quick and economical change of the center in order to accept workpieces of various sizes having center holes of widely differing diameters, without the need to replace the entire device in the machine. Furthermore, Rowe et al. does not make provision for securing the center pin in place once the workpiece is positioned thereon. Nor does Rowe et al permit use of the device to machine a workpiece of diameter smaller than that of its center pin.

It is therefore an object of this invention to provide an improved center stop system that will permit rapid interchangeability of centers of various size so as to accommodate workpieces having center holes of variously sized diameters. It is a further object of this invention to permit such interchangeability without the necessity of replacing the entire center stop device in the machine. It is a still further object of this invention to provide an improved device that will permit securing the spring-mounted center pin in a given position after the workpiece is positioned thereon. And it is another object of this invention to permit convenient utilization of the system with a workpiece of diameter less than that of the center pin.

Objects and advantages of the invention are set forth in part above and in part below. In addition, these and other objects and advantages of the invention will become apparent herefrom, or may be appreciated by practice with the invention, the same being realized and attained by the instrumentalities, combinations, and methodologies pointed out in the appended claims. Accordingly, the invention resides in the novel parts, arrangements, combinations, steps, methods, and improvements herein shown and described.

SUMMARY OF THE INVENTION

Briefly described, the system of the present invention includes a master sleeve to be fitted into the standard tapered socket of a machine tool spindle. An interchangeable center housing is fitted into a tapered socket in said master sleeve, and a center pin is spring-mounted within said housing. The center pin projects out of said housing, and is retractable into the housing as required when the workpiece is positioned on the machine tool. If desired, the housing can be quickly removed from the master sleeve and replaced with a housing having a center pin of a different diameter, in order to accommodate a workpiece having a center hole of different diameter than that of the previous workpiece. A locking screw is provided in the housing to permit locking of the center pin in place after the workpiece has been mounted thereon. A facing disc can be positioned on the projecting end of the center pin in order to accommodate workpieces of diameter smaller than that of the center pin itself.

It will be understood that the foregoing general description as well as the following detailed description are explanatory of the invention and are not intended to be restrictive thereof. Accordingly, the accompanying drawings, referred to herein and forming a part hereof, illustrate preferred embodiments of the invention and, together with the description, serve to explain the principles of the invention.

BRIEF DESCRIPTION OF THE DRAWINGS

FIG. 1 is an exploded perspective view of the center stop device of the present invention.

FIG. 2 is a cross-sectional view of the master sleeve and center housing taken along the plane 2—2 of FIG. 1, and also showing the center pin, spring, and retaining nut in elevation view.

FIG. 3 is an elevation view of the center pin, as seen from a position facing the pointed end of the pin.

FIG. 4 is a close-up view, partly in cross-section, of the center stop device of the present invention, having a workpiece in position against the locating face of the device.

DETAILED DESCRIPTION OF THE INVENTION

Figure 5:
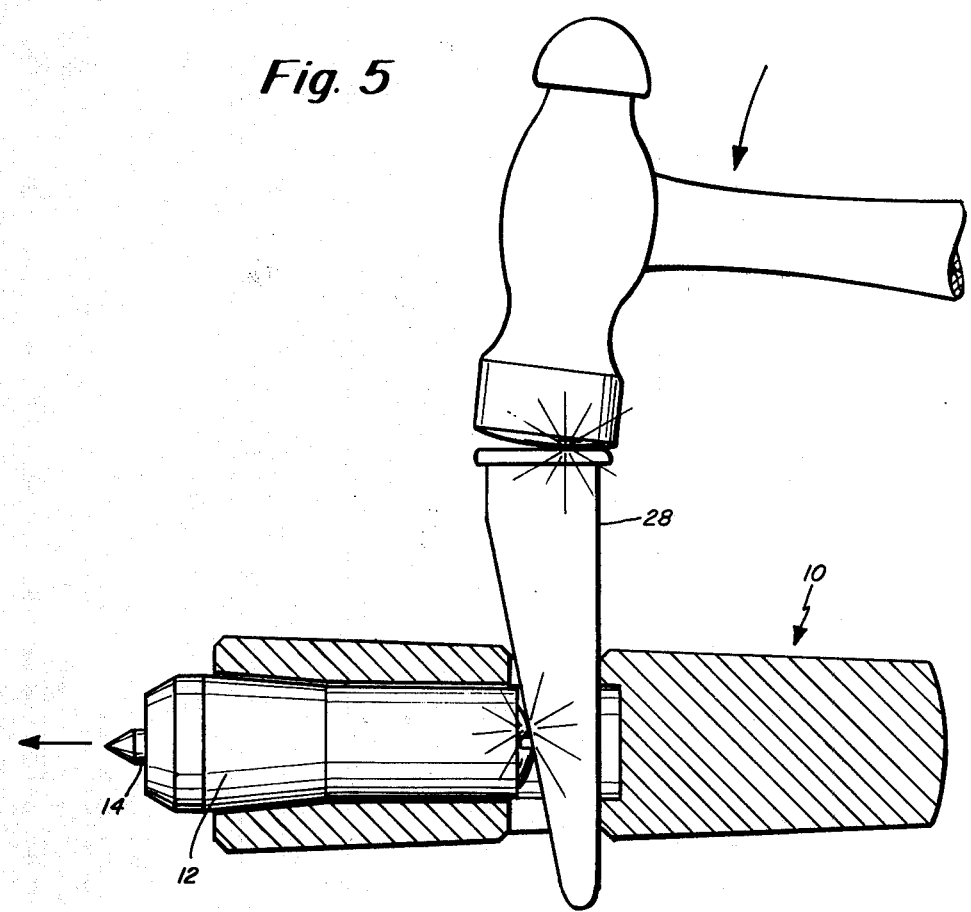
FIG. 5 illustrates a method for rapid release of the center housing from the master sleeve in accordance with the present invention.

A center stop device according to the system of the present invention is shown in FIGS. 1 and 2. Master sleeve 10 is appropriately tapered to fit into the socket of the machine spindle in which it will be used, the size and taper of machine spindles being standard in the machine tool industry. The "butt" end of master sleeve 10 is provided with a raised portion 9 to prevent damage to the master sleeve when it is removed from the machine spindle as explained below, which damage might cause misalignment of the master sleeve in the spindle. Interchangeable center housing 12 is so shaped as to fit snugly within partially tapered socket 11 in master sleeve 10; in particular, in the preferred embodiment shown in FIG. 2 the outer portion of the socket 11 of master sleeve 10 and the corresponding portion of center housing 12 are provided with a 5° taper, so that they can be tightly fitted and readily released, as further explained below. Center housing 12 further includes a constant locating face 22 against which the workpiece is to be positioned. Center pin 14 is movably mounted within a passage in housing 12, and is normally urged to the position shown in FIG. 2 by spring 16 located within housing 12, which spring 16 presses against spring retaining nut 18 positioned at one end of housing 12. Center pin 14 is preferably T-shaped, the head of the T being in contact with spring 16, while the shaped leg of the T projects out of housing 12 to fit into the center hole of the workpiece or part to be machined. (See FIG. 4). The projecting tip of center pin 14 is ground to any desired shape for reception by the workpiece; generally, however, the tip is ground to an included angle of 60°, as shown in FIG. 2. A given center pin can accommodate a range of center hole diameters, from a diameter equal to that of the pin down to a relatively small size, provided that the workpiece itself is not smaller in diameter than the pin. Master sleeve 10, housing 12, and center pin 14 are preferably made of high-grade tool steel, heat-treated and stress-relieved for long life. The parts of the device are machined to close tolerances to insure tight fit. It is critical to successful operation of the instant invention that constant locating face 22 of housing 12 be perpendicular to the axis of the device, and that concentricity of the center pins with the axis of the device be maintained with each change of the center pin.

Spring retaining nut 18 is held in place by screw threads provided internally at the innermost or "butt" end of housing 12. Nut 18 includes a recessed counterbore in its shaft, which captures the base of spring 16 to prevent said spring from moving out of position. Once threaded into place, nut 18 bottoms out on a shoulder to insure that it will not come loose. Located on the other end of nut 18 is a radial surface or head which serves as contact point for the extracting tool called a drift (explained below), and also to protect the butt end of the center housing from being damaged when housings are interchanged. By removing nut 18, spring 16 can be removed from housing 12, and a worn or damaged center pin 14 can be easily and quickly removed for repair or replacement.

FIG. 2 also depicts locking screw 26 located in housing 12, external to master sleeve 10 and so positioned for engagement with flat surface 29 (FIG. 3) on center pin 14 that by tightening screw 26, center pin 14 can be secured in place during machining of workpiece 20. Thus center pin 14 will be caused to rotate along with rotation of the headstock spindle.

Turning to FIG. 5, it will be seen that the instant invention permits rapid interchangeability of center pins by removal of center housing 12 from master sleeve 10 and insertion of a new housing with another center pin, perhaps of a smaller or larger diameter as desired. Master sleeve 10 includes a channel 20 perpendicular to the axis of the device, through which housing 12 can be quickly released from master sleeve 10 by a sharp blow at the back of the housing within channel 20. The matching 5° tapers of housing 12 and socket 11 of master sleeve 10 permits such quick release. As shown in FIG. 5, the required blow at the back of housing 12 can be delivered by a downward blow on drift 28. Drift 28 is a small, inclined steel wedge commonly used in the industry, which fits into channel 20 in master sleeve 10 in a vertical position. The straight vertical edge of drift 28 is preferably placed so that it faces the rear of the master sleeve, while the tapered end faces front; the tapered edge also is tangent to the radial surface of retaining nut 18.

To change center housings to accommodate different size center holes, master sleeve 10 must first be ejected from the machine spindle. Any center or machine tool that is located in the headstock or related machines is held in place by a taper fit. As is well known, such tools or centers are removed by forcing them out from the back of the headstock, through a hole in the spindle. This is accomplished, for example, by using a rod long enough to reach the back of the tool. Next, drift 28 is used to quickly expel center housing 12 from master sleeve 10. A different center housing with, perhaps, a different size center can then be inserted into the socket of master sleeve 10. The complete unit is then snapped back into the spindle, and is ready to receive a different size workpiece. Thus a change in centers is accomplished without the need to replace the entire device in the spindle. Master sleeve 10 can be used with interchangeable center housings having centers of various size, all fitting within the socket of a single, resuable master sleeve.

Figure 6:
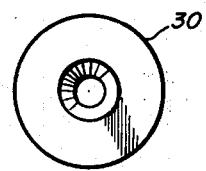
FIG. 6 is an elevation view of a facing disc according to the instant invention, as seen from the side of the disc which contacts the locating face of the device.
Figure 7:
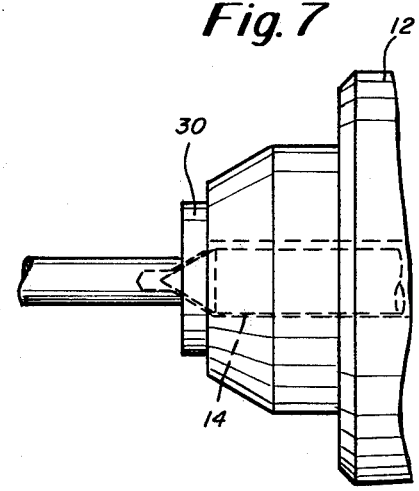
FIG. 7 is an exaggerated view of the placement of a facing disc on the center pin of the device of the present invention.

In some instances, it may occur that one working with the positive stop center system of the instant invention would like to machine a workpiece of a diameter less than that of the smallest center pin available. In such case, if the workpiece were positioned against the center stop device heretofore described, it would be forced back into the center pin passage itself. To eliminate this problem, and thus to extend the range of applicability of the device, a facing disc may be provided for placement over center pin 14, to effectively increase the length of center housing 12, or alternatively decrease the length of center pin 14 that extends beyond locating face 22. As shown in FIGS. 6 and 7, facing disc 30 includes parallel flat sides, with a tapered center hole, preferably of 60° taper to match that of the preferred taper of center pin 14. It will readily be seen that, by making disc 30 thicker or thinner, less or more of the pointed end of pin 14 will protrude beyond the disc, which now serves as the locating face of the device; the less of pin 14 that protrudes, the smaller the workpiece that can be positioned on the tip of the pin and in contact with the disc. Facing disc 30 is made of high grade tool steel, heat-treated, tempered, and ground. Use of disc 30 eliminates any need for costly small diameter center pins.

Thus the positive stop center system of the present invention can be used to economically and rapidly accommodate a vast range of workpiece diameters, while requiring only a single master sleeve. As a result, substantial cost savings can be realized over prior art devices and systems.

It will be readily appreciated by those skilled in the art that the present invention in its broader aspects is not limited to the specific embodiments herein shown and described. Accordingly, variations may be made from the embodiments described herein which are within the scope of the accompanying claims, without departing from the principles of the invention and without sacrificing its chief advantages.

What is claimed is:

1. A system for accurately positioning and locating a workpiece in a machine tool, said system being employed at the headstock spindle of the machine tool, comprising:

a master sleeve shaped for frictional engagement by said headstock spindle, and having a tapered cavity therein;

an interchangeable center housing shaped for frictional engagement with, and quick release from, the walls of said cavity, having a shoulder against which said workpiece rests when located and positioned in said machine tool, and having a passage therethrough;

removable securing means forming a mechanical seal at one end of said passage;

a center pin slidably mounted within said passage, a first end of said pin projectable out of said housing and said passage and beyond said shoulder, for engagement with the center hole at one end of said workpiece; and spring means located in said passage, one end of said spring means being positioned against said securing means, the other end being in contact with the second end of said center pin, for urging the first end of said center pin into a position normally extended beyond said shoulder, said spring means being compressible when the workpiece is positioned and located on the center pin at the headstock of the machine tool;

wherein said passage includes an enlarged chamber, the second end of said center pin comprises an enlarged head projecting into said chamber, said securing means forms the innermost wall of said chamber, and said enlarged head is pushed against the opposite wall of said chamber by said spring means when the center pin is in normal position.

2. The system of claim 1 further comprising locking screw means located in said housing external to said master sleeve, and communicating with said passage, for securing said center pin in a given position.

3. The system of claim 1 further comprising facing disc means for placement over the protruding end of said center pin, to provide an alternative shoulder for said workpiece.

* * * * *